Feb. 8, 1966     A. E. LADEWIG ETAL     3,233,718
BOTTLE DISCHARGE APPARATUS
Filed Jan. 2, 1964     2 Sheets-Sheet 1
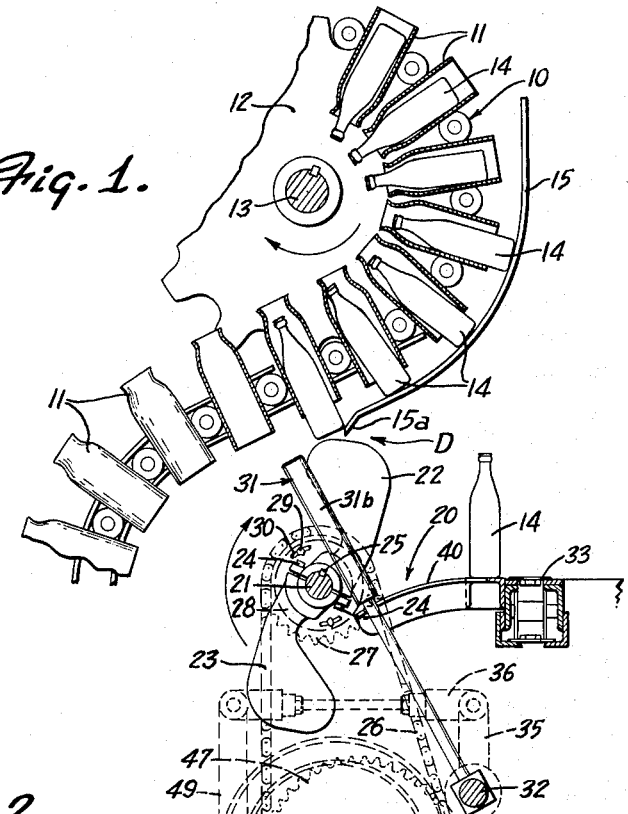
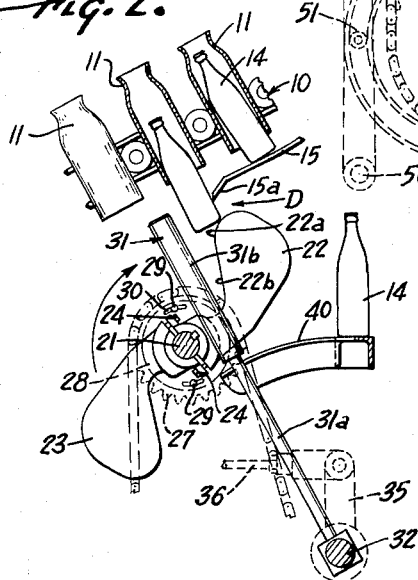
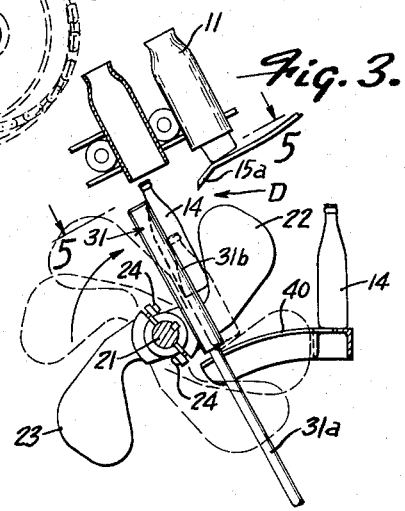
INVENTORS.
ARCHIE E. LADEWIG
JERRY J. BELGER
BY
Lieber & Nilles
ATTORNEYS

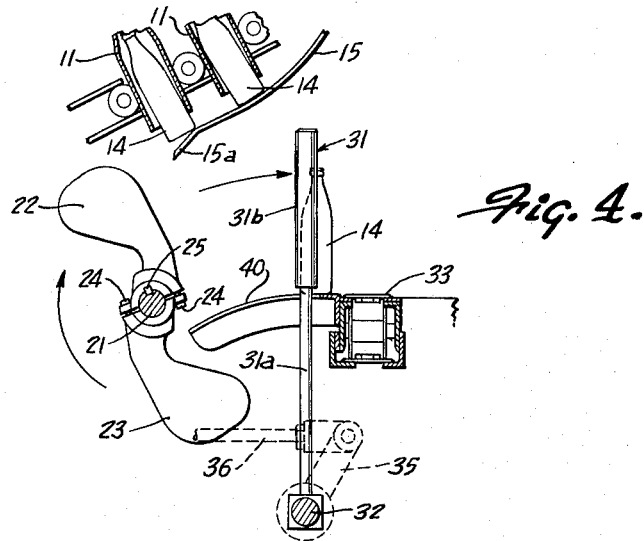
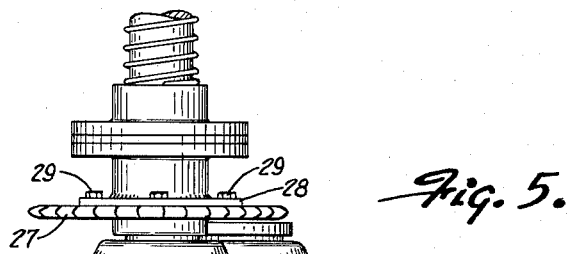
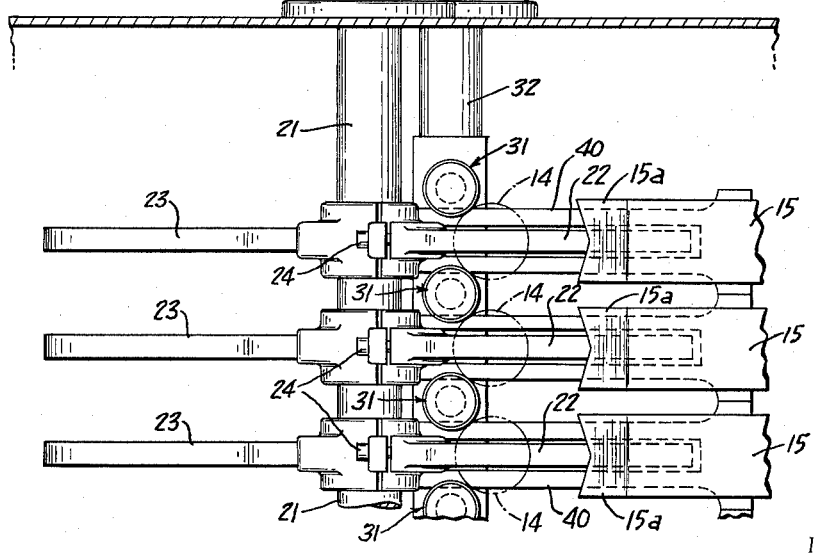
Fig. 4.
Fig. 5.
INVENTORS.
ARCHIE E. LADEWIG
JERRY J. BELGER
BY
Lieber & Nilles
ATTORNEYS United States Patent Office 3,233,718
Patented Feb. 8, 1966

3,233,718
BOTTLE DISCHARGE APPARATUS
Archie E. Ladewig and Jerry J. Belger, Waukesha, Wis., assignors to Archie Ladewig Co., Waukesha, Wis., a corporation of Wisconsin
Filed Jan. 2, 1964, Ser. No. 335,060
13 Claims. (Cl. 198—24)

This invention relates to a discharge apparatus, and more particularly to apparatus for discharging bottles, jars or similar containers from machines for washing and rinsing the same.

A primary object of the present invention is to provide an improved bottle discharging apparatus which is simple and compact in construction and which is moreover adapted to effectively and efficiently discharge bottles rapidly and smoothly from a bottle washing machine wherein bottle breakage and other damage thereto is substantially minimized.

Various devices have heretofore been proposed for discharging bottles from a bottle washing machine. Most of these prior devices include an oscillatory member which is actuated periodically in timed relation to the operation of the bottle washing machine and the conveyor incorporated therein to continuously discharge bottles therefrom. U.S. Patent No. 1,775,003, for example, illustrates the use of bottle ejectors supported for periodic oscillation about a pivot for pushing clean bottles from successive rows of bottle carriers to laterally spaced and weighted bottle retainers secured to an oscillatory support for delivery to a bottle conveyor. In turn, U.S. Patent No. 2,551,140 discloses apparatus wherein a cam actuated oscillatory bottle receiving rack for delivering clean bottles to bottle discharge conveyor mechanism is incorporated. Such prior discharge devices were however unduly complex and furthermore tended to limit the speed of the bottle discharge operation while also occasioning marring, scratching, and breaking of the bottles.

In an effort to avoid some of the disadvantages of the above prior art, U.S. Patent No. 2,858,929 proposed the provision of discharge apparatus having cams adapted to receive and lower bottles along a curved surface of the cam as it is rotated thus transferring bottles from the bottle carrier pockets to a platform, and wherein another portion of the same rotating cam engages the bottle on the platform to push the bottles toward the discharge conveyor. In such devices, a fixed guide means extends between the discharge station and the platform for guiding the bottles as they are lowered along the curved surface of the rotating cam. Thus, bottle discharge apparatus has heretofore been provided which embodies a rotating cam having both a curved lowering portion and a curved pusher portion. However, a disadvantage of such a cam device is that it must lower the bottle during part of the cam rotation and await continued rotation of the cam until the pusher portion of the cam is rotated into position to push the bottle onto a discharge conveyor.

There is therefore a need for a faster more effective bottle discharge means, and such need has been solved by the present invention wherein a plurality of cams are utilized. In the preferred embodiment, two cams are attached to a rotating shaft in substantially diametric opposition. As one cam lowers the bottle from the bottle carrier of the bottle washing machine, the other cam is simultaneously being brought into position to receive the next bottle. Coacting with the rotation of the pair of cams is an ejector or set-up member, which serves as a bottle lowering guide when one of the pair of cams is lowering the bottle, and when the bottle has been lowered, the ejector or set-up member moves the bottle to a discharge conveyor and returns to its initial lowering and guiding, and positioning the bottles to a discharge contion to lower the next bottle for discharge.

The use of a plurality of cams circumferentially spaced on a rotating shaft offers a more efficient and more rapid removal of bottles from a bottle washing machine, and a minimum amount of apparatus is required for lowering, guiding, and positioning the bottles to a discharge conveyor.

It is therefore another object of the invention to provide an improved bottle discharge apparatus wherein a plurality of circumferentially spaced rotatable cams are employed to rapidly and effectively lower bottles from bottle carrier apparatus.

It is another object of the invention to provide cams arranged in diametric opposition on a rotatable shaft to provide discharge apparatus wherein a bottle is lowered by one cam as the other cam is thereby being moved into position to receive the next bottle.

It is a further object of the invention to provide an arcuately positionable ejector for guiding and removing bottles lowered by cam rotation.

It is still another object of the invention to provide a rotatable cam and oscillatable ejector or pusher, or set-up member for bottle discharge from a bottle washing machine wherein a variety of sizes of bottles may be effectively handled and discharged therefrom.

It is a further object of the invention to provide a bottle discharge apparatus embodying bottle guide means for effectively guiding and lowering successive bottles along a cam surface prior to ejecting said bottle onto a conveyor.

It is another object of the invention to provide a pair of unique cams arranged in diametric opposition on a rotatable shaft for rapidly lowering bottles for discharge with a minimum of breakage or damage.

It is further an object of the invention to provide discharge apparatus incorporating a depending lip for effectively positioning and lowering bottles as they are received by a discharge cam from a bottle washer.

These and other objects and advantages of the invention will become apparent from the following detailed description.

A clear conception of the several features constituting the present invention may be had by referring to the drawings accompanying and forming a part of this specification, wherein like reference characters designate the same or similar parts in the various views.

FIGURE 1 is a fragmentary elevational view of the discharge end of a bottle washing machine showing the bottle discharge means of the invention;

FIGURE 2 is another fragmentary elevational view similar to that of FIGURE 1, but illustrating another position of the bottle discharge cam;

FIGURE 3 is an elevational view similar to that of FIGURES 1 and 2, but illustrating still another position of the bottle discharge means;

FIGURE 4 is a similar fragmentary view showing the cam means rotated to a still further position and with the ejector or pusher rods actuated to discharge the bottles from the unloading zone; and cams may be employed.

FIGURE 5 is an enlarged fragmentary plan view taken along line 5—5 of FIGURE 3.

While the improvements have been illustrated and described as being especially advantageously embodied in a bottle washing machine and as embodying pairs of diametrically opposed cams, it is not intended to thereby unnecessarily limit or restrict the invention since the discharge means may be used to like advantage with other containers and container handling equipment and a greater or lesser number of circumferentially spaced cams may be employed. It is also contemplated that certain descriptive terminology used herein shall be given the broadest possible interpretation consistent with the disclosure.

Referring to the drawings, an endless carrier 10 of a bottle washing machine, which may be of the kind shown and described in detail in U.S. Patent No. 2,551,140, is shown as having a plurality of laterally spaced rows of bottle pockets 11 arranged in tandem. The carrier 10 includes a chain or chains which are entrained about a drive sprocket 12 that is keyed to a rotatable shaft 13. The shaft 13 is driven by an appropriate drive mechanism (not shown) to rotate sprocket 12 and position bottle carriers 11 containing bottles 14 toward a discharge station "D." A container support and guide member 15 is located a predetermined distance from the periphery of said sprocket 12 to receive and guide bottles 14 as they slide within carriers 11 during advancement of the carriers toward the discharge station.

It should be noted that while one sprocket and carrier 10 is described herein, a plurality of such sprockets, chains and pockets arranged in successive side-by-side parallel rows are ordinarily found on bottle washing machines (see, for example, U.S. Patent No. 2,551,140) so that a plurality of bottles are simultaneously discharged from each of the successive carriers of a bottle washing machine.

A guide plate member 15 is provided for each row of bottle pockets 11, and serves to guide the bottles 14 to the discharge station "D." Reference is made to depending lip 15a of the guide member which serves as a discharge ramp to guide each bottle 14 smoothly and effectively to the bottle discharge apparatus 20 at the discharge station, as described in greater detail hereinafter.

Specifically, the bottle discharge apparatus includes a driven shaft 21 on which are secured a pair of diametrically opposed cams 22 and 23. In the preferred embodiment, the cams 22 and 23 are shown in diametrically opposed pairs with cam 22 mounted on shaft 21 out of phase with cam 23 by approximately 180°, so that rotation of the pair of cams allows one of the cams to lower a bottle while the other is being rotated toward and into a bottle receiving position. As shown in FIGURE 5, the cams 22 and 23 are in substantial alignment with guide members 15 and depending lips 15a to thereby smoothly and gently receive bottles from the successive pockets 11 of each endless carrier 10 for bottle discharge therefrom.

Also in the preferred embodiment, the cams 22 and 23 are secured to each other and are clamped and keyed onto shaft 21 as by bolts 24 and key 25 so that the pair of cams simultaneously rotate with shaft 21 and are brought into active position in timed sequence.

The shaft 21 is rotated by a chain 26 driving sprocket 27 which is shown, for purposes of illustration, as being attached as by bolts 29 to a circular plate 28 secured to shaft 21. If it is desired, an adjustment of sprocket 27 relative to plate 28 can be made by loosening bolts 29 that are threaded into sprocket 27 through elongated slots 30 in plate 28. The adjustment of the sprocket 27 relative to the plate 28 results in a change in radial orientation of the cams attached to shaft 21 relative to the sprocket drive to be described in greater detail hereinafter.

Thus, the pair of cams 22, 23 are rotated with shaft 21 when the shaft is powered by chain 26 through sprocket 27 and sprocket 47 keyed to the shaft 48 of a suitable drive motor (not shown). The power means for driving chain 26 may be any suitable motor having a variable speed adjustment wherein the cams may be rotated at various speeds and in timed sequence with the bottle conveyor or carrier 10 as the case may be.

A plurality of parallel guide and push rods 31 are also provided for accurate oscillatory movement between the successive parallel sets of cams 22, 23 as best shown in FIGURE 5. The set-up members 31 are secured to an oscillatory shaft 32 which is driven by a suitable means such as the links 35, 36 and lever 49 pivoted at 50 and rocked by cam 51 to oscillate or rock the members 31 in a predetermined timed relation to the rotation of cams 22, 23. Essentially, the members 31 serve two basic functions: namely (1) to guide each bottle 14 as it is being lowered by a cam 22 or 23; and (2) to move through an arcuate path to push or eject the bottle 14 to a discharge conveyor means 33.

The member 31 comprises a support member 31a and a large diameter member 31b for contacting the bottle 14. Such members 31b may be constructed of or padded with a resilient material to prevent marring or breakage of the bottles. The rods 31 are parallel and arranged successively along shaft 32 and spaced on either side of cams 22, 23 a predetermined distance (see FIGURE 5) to serve as guides as the bottles are lowered by the rotation of cams 22, 23.

The oscillatory shaft 32 moves the rods 31 in an arcuate path by the action of links 35, 36 with the action of these links being intermittent to allow the members 31 to remain stationary while a bottle is being lowered (see FIGURES 1, 2, and 3), and then as a cam 22, for example, is rotated, the link 35 is actuated to cause shaft 32 to oscillate sufficiently to swing the members 31 and cause the same to sweep the bottle 14 toward the discharge conveyor 33. Accordingly, the drive means for the cams 22, 23 and for the members 31 is so coupled as to oscillate the rods 31 in timed sequence with the rotation of the cams.

Attention is now directed to guide member 15 and the depending discharge lip 15a thereof. As shown particularly in FIG. 1, the bottles 14 encounter frictional resistance as the bottoms thereof engage the support or guide member 15 during their advancement to the discharge station. Due to this frictional resistance, the bottles tend to tilt in their respective pockets 11, especially when there is a relatively loose fit of the bottles of various sizes in the pockets 11 of the carrier 10. There is therefore a natural tendency for the bottoms of the successive bottles to drag along the member 15 to varying degrees, thus causing irregularities in the discharge thereof.

We have discovered that the difficulties in the irregular discharge of bottles of various sizes can be satisfactorily obviated by forming the guide member 15 with a smooth and uninterrupted supporting surface and by providing the discharge end of the guide member 15 with an angularly disposed portion 15a which provides a downwardly inclined or depending lip. The depending lip 15a permits the successive bottles to release from the member 15 by force of gravity whereby the bottles each assume a position as illustrated in the drawings wherein they become supported by the forward wall of their respective pockets at the moment of discharge. In other words, the depending lip 15a provides a camming action at the discharge end of the member 15 which causes the successive bottles to gravitate to the forward end of their respective pockets as they travel along the guide plate 15 and approach the discharge end thereof, and since all of the bottles thus assume like positions in their respective pockets, the depending discharge lip 15a insures smooth and uniform delivery of the bottles to the discharge cams 22, 23. It has also been discovered that the most effective results are obtained by making the depending terminal lip 15a of a length substantially equal to or greater than the radius of the pockets 11 as shown.

In FIG. 2, the bottle 14 is received by the trailing upper portion of the cam surface 22a as the bottle leaves lip 15a and carrier 11 by gravity. As the bottle continues to drop by gravity, it is lowered along and follows a straight portion 22b of the rotating cam while the bottle is guided and partially supported by a pair of the members 31 (see FIG. 3). The bottle 14 is lowered by the rotation of cam 22 until the cam rotates through a cooperating pair of bottle receiving platform fingers 40 (see the dotted outline of FIG. 3). At this time the members 31 are actuated to move the bottle along the platform fingers 40 toward bottle discharge conveyor 33 (see FIG. 4) from whence the successive bottles may be moved away from the bottle washing machine.

As the cams 22, 23 are rotating at a predetermined r.p.m. to rapidly discharge bottles from the carriers 11, the cam 23 is being rotated simultaneously with the rotation of cam 22 to a position to receive the next bottle from carrier 11 as it travels down the depending lip 15a (as viewed in the accompanying drawings).

By providing a plurality of successive laterally spaced cam sets 22, 23 for a plurality of successive side-by-side carriers 11, a large number of bottles can be effectively discharged from a bottle washing machine. The pairs of cams 22, 23 allow for coninuous, rapid discharge of bottles as one of the cams of the pair of cams is lowering a bottle while the other of each set of cams is already moving into position to receive the next bottle from the carrier for discharge therefrom. There is no lost time, and no portion of the cams is inefficiently utilized as a bottle ejector, for a separate but coacting ejector is provided.

By having the cams radially adjustable about shaft 21 relative to the sprocket drive, a variety of bottle sizes may be expeditiously handled at the discharge station and timing adjustments may be readily effected. The cams are of simple construction and are also readily repaired and replaceable without excessive shut-down-time. The straight portions 22a and 23a of the cams allow for ease of cam manufacture and efficient and smooth lowering of the bottles during cam rotation. Lateral movement of the bottles during lowering is thus minimized to decrease wear on the cams and ejectors with less possibility of marring or breakage of bottles.

Thus, bottle discharge apparatus has been described and illustrated wherein an endless carrier delivers bottles to a discharge station where they are smoothly and efficiently transferred from a guide member to the surface of a rotating pair of cams and wherein the straight surface on each of the cams lowers the bottle efficiently as the bottle is guided by the ejectors to a set of platform fingers at which time the ejectors move to position the bottle for discharge by a conveyor, and wherein the other cam of the pair of cams is being moved into a position ready to receive the next bottle from the carrier at the guide member.

Various modes of carrying out the invention are contemplated as being within the scope of the following claims particularly pointing out and distinctly claiming the subject matter which is regarded as the invention.

We claim:

1. A container discharge apparatus for a container conditioning machine having carrier means for advancing containers successively to a discharge station, a container support for directing containers toward said discharge station, said container support being provided with a depending terminal discharge lip, a rotating shaft a spaced distance below said depending lip, a pair of diametrically opposed cams mounted on said shaft and rotatable therewith to receive the lower successive containers from said depending lip, an oscillatory shaft substantially parallel to and spaced from said rotating shaft, means carried by said oscillatory shaft and movable thereby in an arcuate path from a container guiding and receiving position to a container discharge position, one of the cams of said pair being rotatable to successively engage said container as said container leaves said depending lip and then lower said container along a surface thereof as said container is guided by said arcuately movable means, and container receiving means adjacent said rotating shaft for receiving the container lowered thereto by said cam, said arcuately movable means being swingable to container discharge position to propel the container along said receiving means, the second cam of said pair being simultaneously rotated toward a position to receive and lower the next container from said depending lip at said discharge station.

2. In a bottle discharging apparatus for a conditioning machine having a bottle carrier means for advancing bottles to a discharge station, a bottle discharge ramp at said discharge station for initially lowering the bottles from said carrier means, rotatable cam means for receiving successive bottles from said ramp and lowering the same from said discharge station, platform means for receiving the bottles lowered by said cam means, and means for guiding said bottles during cam lowering thereof and for thereafter pushing each of said bottles along said platform means toward a discharge conveyor, said guide means including an oscillatory shaft having radiating guide and ejector members carried thereby, said members extending on both sides of said rotatable cam means for guiding said bottles during lowering by said cam means and for thereafter moving said bottles along said platform toward said discharge conveyor.

3. The bottle discharge apparatus of claim 2, wherein said cam means comprises a plurality of circumferentially spaced cams carried by a rotatable shaft and wherein rotation of said cams allows a bottle to be lowered by one of said cams while another cam is being positioned to receive another bottle from said bottle carrier means.

4. The bottle discharging apparatus of claim 2, wherein said discharge ramp is formed by a depending lip integral with a bottle support cooperating with said bottle carrier means to advance the bottles to the discharge station.

5. The bottle discharging apparatus of claim 2, wherein said cam means is provided with a straight cam surface for engagement with said bottle wherein rotation of said cam means allows the bottle to be lowered smoothly along said straight cam surface as the bottle is guided and partially supported by and along said guide means.

6. The bottle discharge apparatus of claim 2, wherein said rotatable cam means includes first and second diametrically disposed cams subjacent to said carrier means to receive successive bottles for lowering therefrom, wherein one of said cams lowers said bottle while the other said cam is being simultaneously rotated to a position to receive another bottle from said carrier means.

7. The bottle discharge apparaus of claim 6, wherein said first and second cams are each provided with a straight cam surface for lowering a bottle therealong to said platform as said cams are rotated.

8. The bottle discharge apparatus of claim 2, wherein said rotatable cam means includes a rotatable shaft means and a drive means for said rotatable shaft means wherein said drive means is adjustable to vary the radial position of said cam means relative to said guide means.

9. In a bottle conditioner, bottle carrier means including a succession of pockets for conveying bottles through a conditioning zone to a discharge station, a supporting member having a smooth and uninterrupted supporting surface coacting with projecting portions of the bottles as they are successively advanced by said pockets toward said discharge station, said supporting member being formed with an angularly extending end portion providing a depending terminal lip at said discharge station for releasing the successive bottles from said supporting member, said lip being effective to position the bottles against the forward wall of their respective pockets at the point of discharge therefrom, and discharge means for receiving the released bottles from said depending terminal lip and for conveying them away from said discharge station, said discharge means including an oscillatory guide and set-up member.

10. A bottle conditioner according to claim 9, wherein the discharge means includes a cam having a trailing bottle receiving and lowering surface.

11. A bottle conditioner according to claim 9, wherein the discharge means includes at least one rotatable cam having a trailing bottle receiving and lowering surface cooperating with the oscillatory guide and set-up member to lower the successive bottles and move the same laterally away from the discharge station.

12. A bottle conditioner according to claim 9, wherein the depending terminal lip of the supporting member is substantially equal in length to the radius of the pockets.

13. A container discharge apparatus for a container conditioning machine having carrier means for advancing containers successively to a discharge station, a container support for directing containers toward said discharge station, said container support being provided with a depending terminal discharge lip, a rotating shaft a spaced distance below said depending lip, a cam mounted on said shaft and rotatable therewith to receive and lower successive containers from said depending lip, an oscillatory shaft substantially parallel to and spaced from said rotating shaft, means carried by said oscillatory shaft and movable thereby in an arcuate path from a container guiding and receiving position to a container discharge position, said cam being rotatable to successively engage said container as said container leaves said depending lip and then lower said container along a surface thereof as said container is guided by said arcuately movable means, and container receiving means adjacent said rotating shaft for receiving the container lowered thereto by said cam, said arcuately movable means being swingable to container discharge position to propel the container along said receiving means.

References Cited by the Examiner
UNITED STATES PATENTS

| | | | |
|---|---|---|---|
| 2,106,210 | 1/1938 | Enock | 198—24 |
| 2,738,866 | 3/1956 | Vamvakas et al. | 198—25 |
| 2,858,929 | 11/1958 | Vamvakas et al. | 198—25 |
| 3,121,489 | 2/1964 | Meyer et al. | 198—25 |
| 3,178,005 | 4/1965 | Read | 198—24 |

SAMUEL F. COLEMAN, *Primary Examiner.*